(12) United States Patent
Bahr et al.

(10) Patent No.: US 12,238,673 B1
(45) Date of Patent: Feb. 25, 2025

(54) SYSTEMS AND METHODS FOR AUTOMATICALLY DETERMINING A LOCATION CHARACTERISTIC OF A WIRELESS ACCESS POINT

(71) Applicant: Cable Television Laboratories, Inc., Louisville, CO (US)

(72) Inventors: John C. Bahr, Superior, CO (US); Lili Hervieu, Buford, GA (US)

(73) Assignee: Cable Television Laboratories, Inc., Louisville, CO (US)

( * ) Notice: Subject to any disclaimer, the term of this patent is extended or adjusted under 35 U.S.C. 154(b) by 490 days.

(21) Appl. No.: 17/643,779

(22) Filed: Dec. 10, 2021

Related U.S. Application Data

(60) Provisional application No. 63/123,968, filed on Dec. 10, 2020.

(51) Int. Cl.
*H04W 64/00* (2009.01)
*H04W 84/12* (2009.01)

(52) U.S. Cl.
CPC ....... *H04W 64/003* (2013.01); *H04W 64/006* (2013.01); *H04W 84/12* (2013.01)

(58) Field of Classification Search
CPC .. H04W 64/003; H04W 64/006; H04W 84/12
See application file for complete search history.

(56) References Cited

U.S. PATENT DOCUMENTS

| | | | |
|---|---|---|---|
| 2011/0043407 A1* | 2/2011 | Moshfeghi | G01C 21/20 342/394 |
| 2014/0162689 A1* | 6/2014 | Saldamli | H04W 4/02 455/456.1 |
| 2016/0135007 A1* | 5/2016 | Persson | H04W 4/023 455/456.2 |

\* cited by examiner

*Primary Examiner* — Justin Y Lee
(74) *Attorney, Agent, or Firm* — PdZ Patent Law, PLLC

(57) ABSTRACT

A method for automatically determining a location characteristic of a wireless access point includes (1) receiving, via an array of at least three antenna elements of the wireless access point, a first neighboring wireless communication signal from a first neighboring wireless access point, (2) determining a location of the first neighboring wireless access point, and (3) determining the location characteristic of the wireless access point at least partially based on (a) the location of the first neighboring wireless access point and (b) difference in phase of the first neighboring wireless communication signal between the least three antenna elements of the wireless access point.

16 Claims, 10 Drawing Sheets

SYSTEMS AND METHODS FOR AUTOMATICALLY DETERMINING A LOCATION CHARACTERISTIC OF A WIRELESS ACCESS POINT

CROSS REFERENCE TO RELATED APPLICATIONS

This application claims the benefit of priority to U.S. Provisional Patent Application Ser. No. 63/123,968, filed on Dec. 10, 2020, which is incorporated herein by reference.

BACKGROUND

Wireless access points are widely used to provide communication services. Examples of wireless access points include, but are not limited to, Wi-Fi wireless access points and cellular wireless access points. Many wireless access points do not have a perfectly isotropic antenna radiation pattern, and performance of a wireless access point may therefore be influenced by orientation of the wireless access point relative to its clients.

DETAILED DESCRIPTION OF THE EMBODIMENTS

It may be desirable to determine a location characteristic, such as an angular orientation and/or a two-dimensional location, of a wireless access point. For example, wireless access point coverage may be affected by wireless access point orientation and location, and a party remotely troubleshooting a wireless access point performance issue may therefore find great value in knowing the angular orientation and location of the wireless access point. As another example, a party planning an expansion or upgrade of an existing wireless communication network may need to know angular orientation and two-dimensional location of existing wireless access points. Additionally, a communication network operator may desire to determine angular orientation and/or two-dimensional location of its wireless access points to ensure that its records are complete and accurate.

Wireless access point location characteristics can be manually determined, such as by sending a technician to manually inspect a wireless access point. Such manual determination, however, may be time consuming and costly, and it is therefore generally desirable to automatically determine wireless access point location characteristics. Wireless access point location characteristics are conventionally determined automatically by location-detection hardware, such as a three-axis accelerometer or a magnetometer, within each wireless access point. While such hardware may provide satisfactory performance, it adds cost to a wireless access point and may increase size of the wireless access point.

Disclosed herein are systems and methods for automatically determining a location characteristic of a wireless access point. Certain embodiments of the new systems and methods advantageously do not require dedicated hardware, such as an accelerometer or a magnetometer, to determine a location characteristic of the wireless access point. Instead, the new systems and methods leverage wireless communication signals from neighboring wireless access points to determine location characteristics. Consequently, particular embodiments of the new systems and methods may achieve automatic determination of wireless access point location characteristics at a lower cost than traditional techniques.

Figure 1:
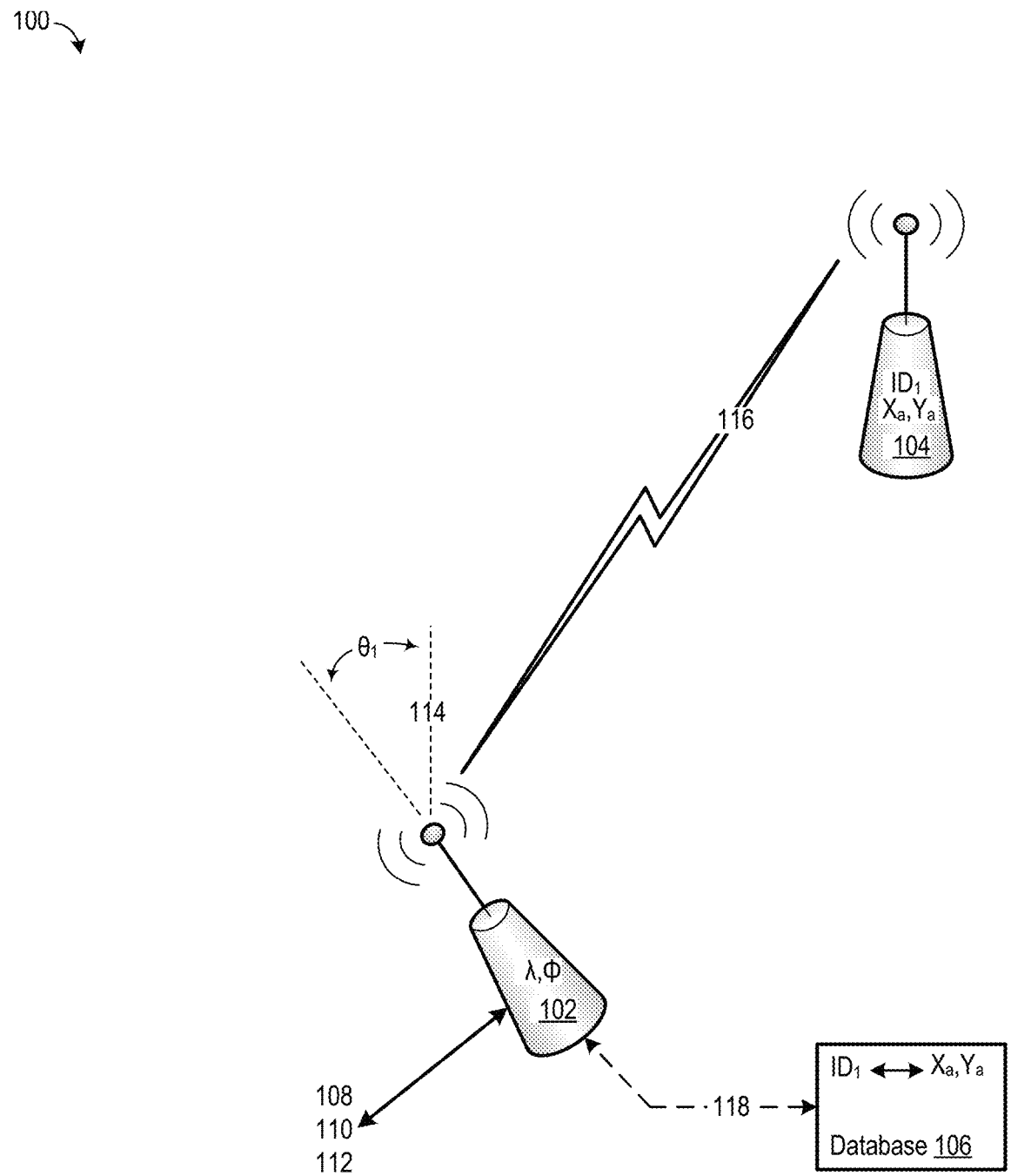
FIG. 1 is a schematic diagram of a communication network environment including a system for automatically determining one or more location characteristics of a wireless access point, according to an embodiment.
Figure 2:
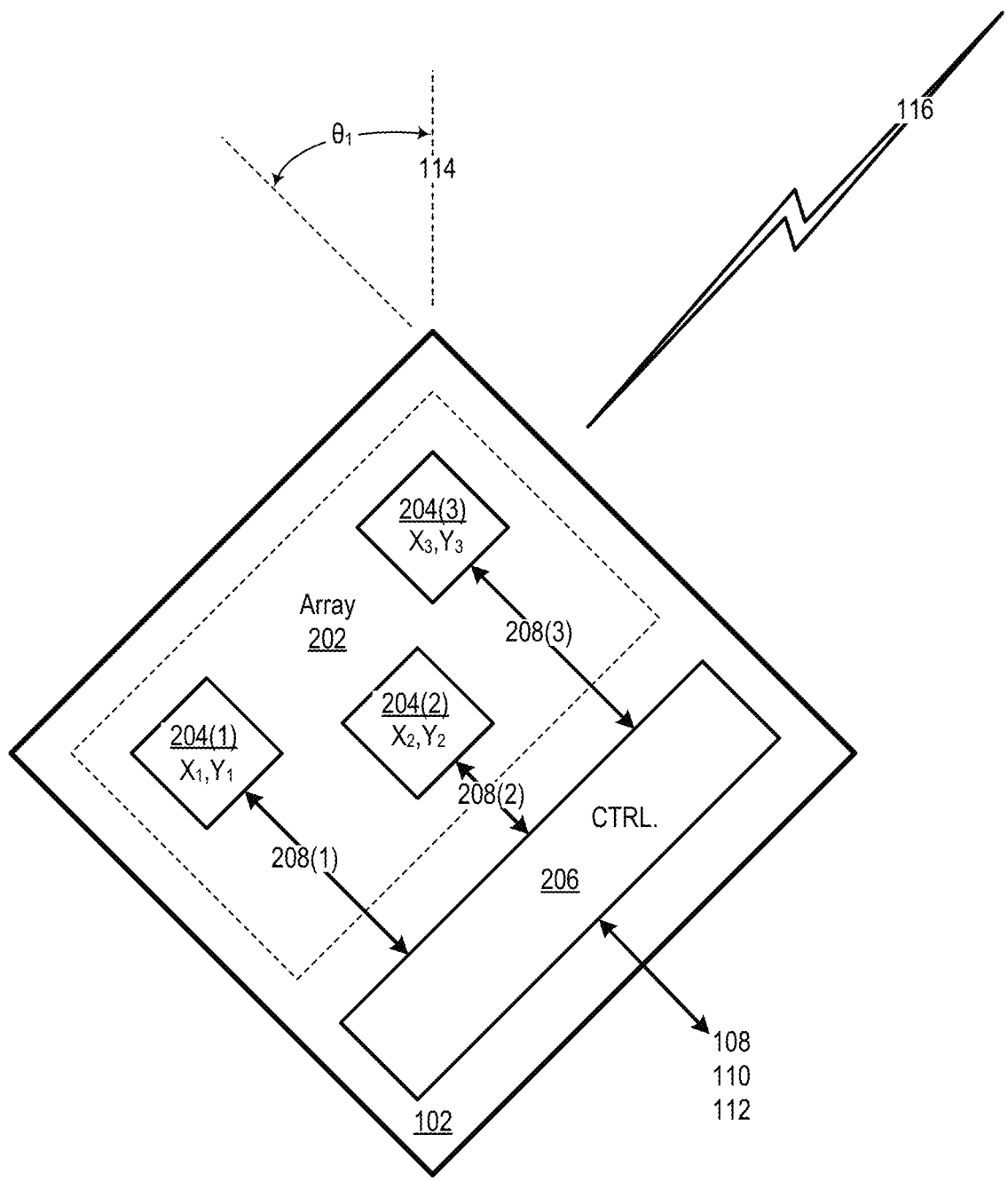
FIG. 2 is a block diagram of a wireless access point of the FIG. 1 communication network environment.

FIG. 1 is schematic diagram of a communication network environment 100 including (1) a wireless access point 102 implementing the new systems and methods and (2) a neighboring wireless access point 104. FIG. 2 is a block diagram of wireless access point 102 showing the wireless access point in greater detail than depicted in FIG. 1. FIGS. 1 and 2 best viewed together in the following discussion. FIG. 1 further depicts a database 106, but database 106 need not be part of communication network environment 100 as long as database 106 is accessible to wireless access point 102. For example, database 106 could be remote from wireless access point 102 and accessible to wireless access point 102 via the Internet and/or another communication network.

Each of wireless access point 102 and neighboring wireless access point 104 is a Wi-Fi wireless access point, e.g., operating according to an Institute of Electrical and Electronics Engineers (IEEE) 802.11-based communication protocol. However, in some alternate embodiments, wireless access points 102 and 104 are other types of wireless access points, including but not limited to cellular wireless access points, e.g., operating according to a long-term evolution (LTE) communication protocol, a fifth generation (5G) communication protocol, and/or a sixth generation (6G) communication protocol. Additionally, in certain alternate embodiments, wireless access point 102 and neighboring wireless access point 104 are each a different type of wireless access point. For example, in some alternate embodiments, such as discussed below with respect to FIG. 6, wireless access point 102 is a Wi-Fi wireless access point and neighboring wireless access point 104 is replaced with a cellular neighboring wireless access point. Wireless access points 102 and 104 may be part of a common communication network, or the wireless access points may be part of different respective communication networks.

Wireless access point 102 is optionally combined with other equipment. For example, in some embodiments, wireless access point 102 is integrated in customer premises equipment (CPE), such as CPE including a modem (e.g., a cable modem, a digital subscriber line modem, or a wireless modem) or an optical network termination (ONT). As another example, in certain embodiments, wireless access point 102 is integrated in a networking component, such as a switch, a router, a hub, or a security gateway.

Referring to FIG. 2, wireless access point 102 includes an (1) array 202 of antenna elements 204 and (2) a controller 206. In this document, specific instances of an item may be referred to by use of a numeral in parentheses (e.g., antenna element 204(1)) while numerals without parentheses refer to any such item (e.g., antenna elements 204). Although array 202 is depicted as including three antenna elements 204, array 202 may include additional antenna elements 204. However, array 202 must include a minimum of three antenna elements 204 to enable automatic determination of location characteristics using the methods discussed below. Each antenna element 204 has a different respective location in array 202. For example, FIG. 2 illustrates each antenna element 204 having a location expressed in rectangular coordinates $X_n$ and $Y_n$, where n is an index denoting the particular antenna element 204. Accordingly, antenna element 204(1) is at location $X_1$, $Y_1$ in array 202, antenna element 204(2) is at location $X_2$, $Y_2$ in array 202, and so on. Locations of antenna elements 204 in array 202 could be expressed in other manners, such as in polar coordinates instead of in rectangular coordinates. Additionally, locations of antenna elements 204 may be expressed relative to one another. For example, location of antenna element 202(2) may be expressed relative to location of antenna element 204(1), and location of antenna element 204(3) may be expressed relative to location of either antenna element 204(2) or antenna element 204(1).

Each antenna element 204 is configured to convert communication signals between the electrical domain and the radio frequency (RF) wireless domain. FIG. 2 depicts respective electrical signals 208 traveling between antenna elements 204 and controller 206. Electrical signals 208 may represent, for example, uplink data, downlink data, and/or control signals. Antenna elements 204 may be purely passive, or antenna elements 204 may include active devices such as amplifiers and/or electronic filters. Additionally, one or more antenna elements 204 may include two or more sub-elements (not shown), such as for transmitting/receiving wireless communication signals in different respective frequency bands. While antenna elements 204 are symbolically shown by boxes in FIG. 2, antenna elements 204 may have any physical configuration as long as they are capable of converting communication signals between the electrical domain and the RF wireless domain. Additionally, physical placement of antenna elements 204 within array 202 is implementation dependent and may vary.

Controller 206 is formed, for example, of analog and/or digital electronics. For example, some embodiments of controller 206 include a processor and a data store, where the processor is configured to execute instructions, such as in the form of software and/or firmware, stored in the data store to perform at least some functions of controller 206. Although controller 206 is depicted as being a single element, controller 206 could include multiple constituent sub-elements which need not be co-located. For example, certain embodiments of controller 206 are at least partially embodied by a distributed computing system, such as a cloud computing system.

Controller 206 is configured to generate electrical signals 208 representing downlink data 108 intended for wireless transmission by wireless access point 102 to one or more clients (not shown). For example, controller 206 may modulate one or more carriers signals according to downlink data 108, such as based on a Wi-Fi communication protocol, to generate electrical signals 208 for antenna elements 204 to convert to corresponding wireless signals. Additionally, controller 206 is configured to demodulate uplink electrical signals 208 generated by antenna elements 204 in response to wireless communication signals received from one or more clients (not shown), to generate uplink data 110. Controller 206 is optionally further configured to perform one or more additional functions, such as error checking and correction, wireless channel management, power management, encryption and decryption, client authentication, and/or other wireless communication functions.

Array 202 and controller 206 are additionally collectively configured to automatically determine one or more location characteristics 112 of wireless access point 102 at least partially based on (a) wireless communication signals from one or more neighboring wireless access points and (b) respective locations of said neighboring wireless access points. Accordingly, array 202 and controller 206 may be collectively referred to a system for determining location characteristics 112, although array 202 and controller 206 additionally perform wireless communication functions, as discussed above. Location characteristics 112 include, for example, one or more of an angular orientation of wireless access point 102 and two-dimensional location of wireless access point 102. The angular orientation of wireless access point 102 includes, for example, a compass orientation of wireless access point 102, and the two-dimensional location of wireless access point 102 includes, for example, latitude and longitude of wireless access point 102. FIGS. 1 and 2 depict wireless access point 102 as having an angular orientation of $\theta_1$ with respect to a reference direction 114 (e.g., a north direction), and FIG. 1 depicts wireless access point 102 as having a latitude $\lambda$ and a longitude $\Phi$. Although angular orientation $\theta_1$ is illustrated as being specified in two dimensions, angular orientation $\theta_1$ could alternately be specified in three dimensions.

Examples A and B below describe two possible methods by which wireless access point 102 may determine location characteristics 112. It is understood, however, that wireless access point 102 is not limited to operating according to these example methods.

Example A

In this example, array 202 and controller 206 collectively determine angular orientation $\theta_1$ of wireless access point 102 solely from information associated with a single neighboring wireless access point, i.e., neighboring wireless access point 104. Neighboring wireless access point 104 generates a neighboring wireless communication signal 116 which is received by wireless access point 102. Neighboring wireless access point 104 may generate neighboring wireless communication signal 116 as part of normal operation of the wireless access point, such as to serve clients (not shown) of the wireless access point. At any given time, phase of neighboring wireless communication signal 116 will differ at each antenna element 204 of array 202 due to antenna elements 204 being at different respective locations in array 202. Due to multipath, the antenna elements 204 may also receive multiple delayed copies of the transmitted signal, and controller 206 may choose to use only non-multipath received signals. Controller 206 is configured to determine phase of neighboring wireless communication signal 116 at each antenna element 204 from electrical signals 208 generated by antenna elements 204 in response to neighboring wireless communication signal 116. For example, neighboring wireless communication signal 116 may have different respective phases A, B, and C at antenna elements 204(1), 204(2), and 204(3), as summarized in Table 1 below.

TABLE 1

| Location | Phase of Signal 116 |
| --- | --- |
| Antenna Element 204(1) | A |
| Antenna Element 204(2) | B |
| Antenna Element 204(3) | C |

Controller 206 is also configured to determine a location of neighboring wireless access point 104. FIG. 1 illustrates neighboring wireless access point 104 having a location defined by rectangular coordinates $X_a$ and $Y_a$, which are, for example, latitude and longitude of neighboring wireless access point 104. However, location of neighboring wireless access point 104 could be expressed in other manners, such as by using polar coordinates or by relating location of neighboring wireless access point 104 to location of wireless access point 102. In some embodiments, controller 206 is configured to determine location of neighboring wireless access point 104 using a two-step process. First, controller 206 determines an identity of the wireless access point generating neighboring wireless communication signal 116. For example, in some embodiments, controller 206 decodes a Wi-Fi beacon included in neighboring wireless communication signal 116 to determine a basic service set identifier (BSSID) of the wireless access point generating the signal. The BSSID, henceforth referred to as $ID_1$ for brevity, identifies wireless access point 104, and in some embodiments, $ID_1$ is associated a media access control (MAC) address of neighboring wireless access point 104.

Second, controller 206 determines a location of neighboring wireless access point 104 from the identity determined in the first step. Controller 206 determines the location of neighboring wireless access point 104 from $ID_1$, for example, by querying database 106 which associates identities of wireless access points with their respective locations. For example, FIG. 1 illustrates database 106 as associating $ID_1$ of neighboring wireless access point 104 with location $X_a$, $Y_a$ of the wireless access point. In some embodiments, database 106 is part of a mapping application that tracks locations of known wireless access points. Database 106 is optionally generated at least partially using crowdsourcing techniques, such as from applications installed on client devices that identify and report available wireless access points and their respective locations. FIG. 1 illustrates wireless access point 102 being communicatively coupled to database 106 via a communication link 118, which may be either a logical communication link or a physical communication link. In some alternate embodiments, though, database 106 is incorporated in whole or in part in wireless access point 102. In certain alternate embodiments, neighboring wireless access point 104 sends its location $X_a$, $Y_a$ to wireless access point 102, such as using an out-of-band telemetry portion of neighboring wireless communication signal 116 or using another logical and/or physical communication link between wireless access points 102 and 104.

Controller 206 also has knowledge of locations of antenna elements 204 within array 202, e.g., that antenna elements 204(1), 204(2), and 204(4) have respective locations $X_1$, $Y_1$; $X_2$, $Y_2$; and $X_3$, $Y_3$ in array 202. For example, these locations may be stored in a data store (not shown) of controller 206 during manufacturing of wireless access point 102 or during initial configuration of wireless access point 102. Controller 206 determines angular orientation $\theta_1$ of wireless access point 102 based on (a) difference in phase of neighboring wireless communication signal 116 between antenna elements 204. (b) relative or absolute locations of antenna elements 204 in array 202, and (c) location of neighboring wireless access point 104, using one or more conventional angle of orientation calculation method known in the art. It should be appreciated that wireless access point 102 determines angular orientation $\theta_1$ without use of an accelerometer or a magnetometer, thereby helping minimize cost and size of wireless access point 102. However, wireless access point 102 can only conclusively determine angular orientation $\theta_1$ in two dimensions based on information from solely one neighboring wireless access point. Accordingly, some embodiments of wireless access point 102 further include an accelerometer, magnetometer, or similar device, to enable the wireless access point to determine it angular orientation in three dimensions.

Example B

Angular orientation $\theta_1$ of wireless access point 102 can be determined based on information from a single neighboring wireless access point, such as using the method discussed above with respect to Example A. However, information from two or more neighboring wireless access points is required to determine two-dimension location $\lambda$ and $\Phi$ of wireless access point 102. Additionally, accuracy of determined location characteristics generally increases with increasing number of neighboring wireless communication signals considered in the determination process. Accordingly, some embodiments of controller 206 are configured to determine location characteristics 112 based on neighboring wireless communication signals from two or more different wireless access points.

Figure 3:
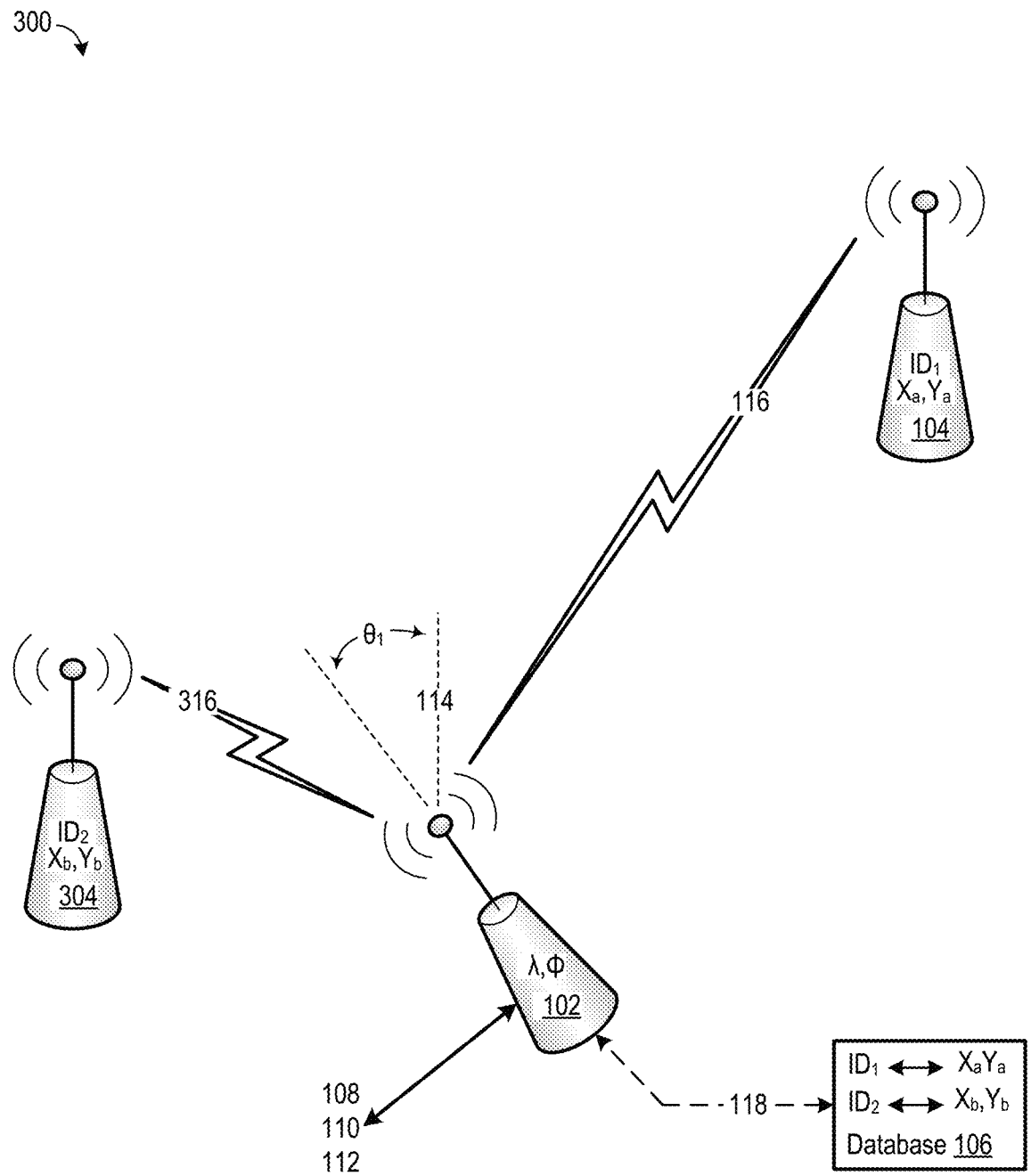
FIG. 3 is a schematic diagram of an alternate embodiment of the FIG. 1 communication network environment including an additional neighboring wireless access point.
Figure 4:
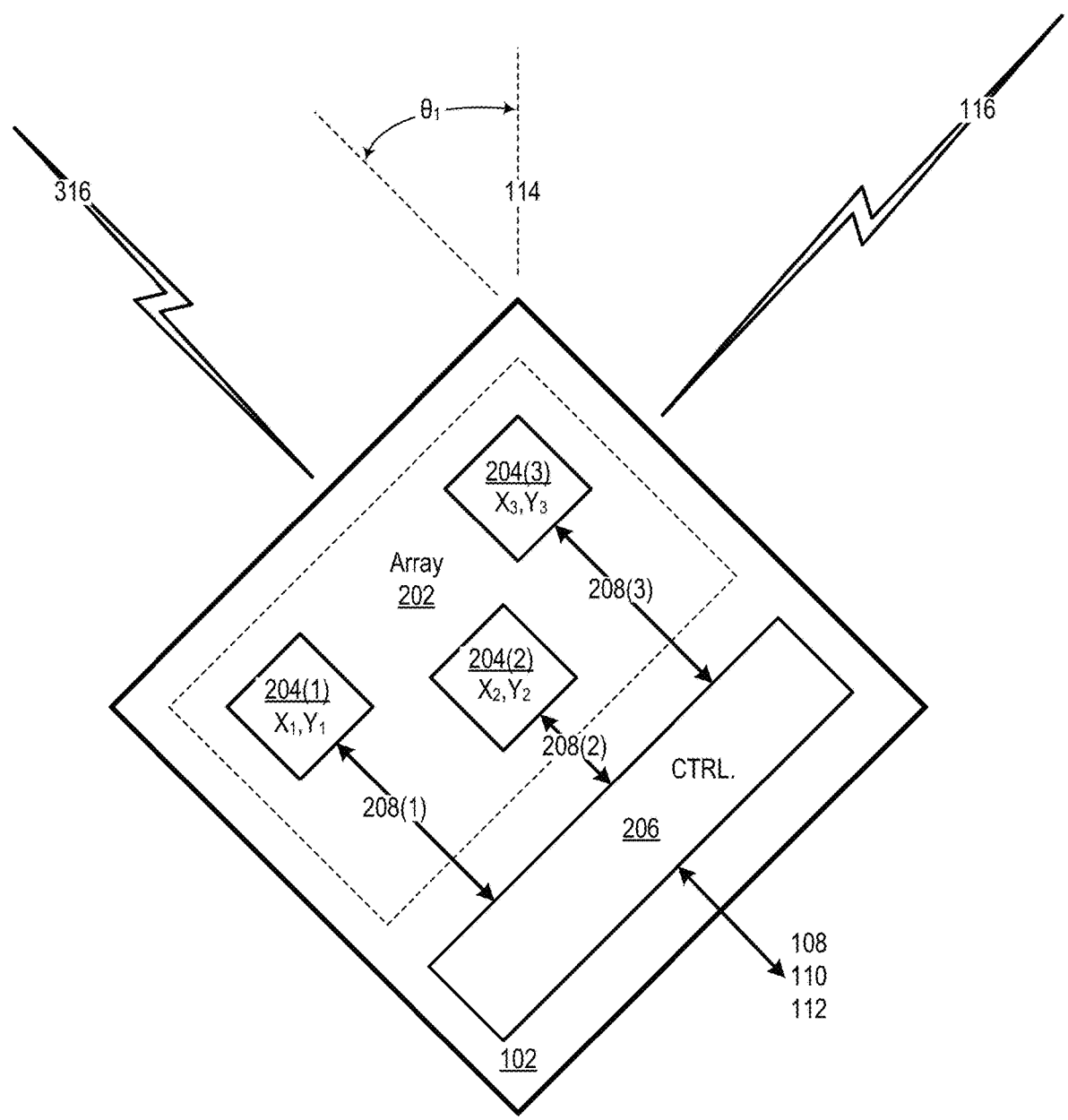
FIG. 4 is a block diagram of a wireless access point of the FIG. 3 communication network environment.

For example, FIG. 3 is a schematic diagram of a communication network environment 300 which is like environment 100 of FIG. 1 but further including an additional neighboring wireless access point 304. FIG. 4 is a block diagram of wireless access point 102 showing the wireless access point in greater detail than depicted in FIG. 3. Each of wireless access points 102, 104, and 304 may be a common type of wireless access point (e.g., a Wi-Fi wireless access points), or two or more of these wireless access points may be different types of wireless access points (e.g., Wi-Fi and cellular wireless access points), as long as wireless access point 102 is capable of determining locations of different types of wireless access points. Neighboring wireless access point 304 generates a neighboring wireless communication signal 316 which is received by wireless access point 102, along with neighboring wireless communication signal 116 from neighboring wireless access point 104.

At any given time, phase of neighboring wireless communication signal 316 will differ at each antenna element 204 of array 202 due to antenna elements 204 being at different respective locations in array 202. Additionally, as discussed above with respect to example A, at any given time, phase of neighboring wireless communication signal 116 will differ at each antenna element 204 of array 202. Furthermore, as discussed above with respect to example A, controller 206 may choose to use only non-multipath received signals. Controller 206 is configured to determine phase of neighboring wireless communication signals 116 and 316 at each antenna element 204 from electrical signals 208 generated by antenna elements 204. For example, neighboring wireless communication signal 116 may have different respective phases A, B, and C at antenna elements 204(1), 204(2), and 204(3), and neighboring wireless communication signal 316 may have different respective phases D, E, and F at antenna elements 204(1), 204(2), and 204(3), as summarized in Table 2 below.

TABLE 2

| Location | Phase of Signal 116 | Phase of Signal 316 |
| --- | --- | --- |
| Antenna Element 204(1) | A | D |
| Antenna Element 204(2) | B | E |
| Antenna Element 204(3) | C | F |

Controller 206 is also configured to determine respective locations of each of neighboring wireless access points 104 and 304, such as using a method similar to that discussed above with respect to Example A. For example, in some embodiments, controller 206 determines respective BSSIDs $ID_1$ and $ID_2$ of neighboring wireless access points 104 and 304 from Wi-Fi beacons included in neighboring wireless communication signals 116 and 316. In these embodiments, controller 206 queries database 106 to determine respective locations $X_1, Y_1$ and $X_2, Y_2$ of neighboring wireless access points 104 and 304 from BSSIDs $ID_1$ and $ID_2$. As illustrated in FIG. 3, some embodiments of database 106 associate both $ID_1$ and $ID_2$ with locations of their respective base stations. Controller 206 also has knowledge of locations of antenna elements 204 within array 202, in the same manner discussed above with respect to Example A.

Controller 206 determines both of angular orientation $\theta_1$ of wireless access point 102 and two-dimensional location $\lambda$ and $\Phi$ of wireless access point 102 based on (a) difference in phase of neighboring wireless communication signal 116 between antenna elements 204, (b) difference in phase of neighboring wireless communication signal 316 between antenna elements 204, (c) relative or absolute locations of antenna elements 204 in array 202, and (d) respective locations of neighboring wireless access point 104 and 304, using one or more conventional angle of orientation and location calculation methods known in the art. For example, in some embodiments, controller 102 determines angle of incidence of each of neighboring wireless communication signals 116 and 316 at wireless access point 102, and controller 206 determines angular orientation $\theta_1$ and location $\lambda$ and $\Phi$ from the angles of incidence and locations of neighboring wireless access points 104 and 304. It should be appreciated that wireless access point 102 determines location characteristics $\theta_1$, $\lambda$, and $\Phi$ without use of an accelerometer or a magnetometer, thereby helping minimize cost and size of wireless access point 102. Additionally, wireless access point 102 is capable of determining angular orientation $\theta_1$ in three dimensions without use of an accelerometer or magnetometer, using the Example B method. The method of Example B can be extended to consider neighboring wireless communication signals from additional neighboring wireless access points, such as to increase accuracy of determined location characteristics 112.

Wireless access points are often capable of operating in more than one frequency band. For example, a Wi-Fi wireless access point may be capable of operating in two or more a 2.4 gigahertz (GHz) frequency band, a 5 GHz frequency band, and a 6 GHz frequency band. Additionally, a Wi-Fi wireless access point may be capable of operating in a plurality of channels in a given frequency band. Accordingly, in some embodiments, neighboring wireless access points 104 and 304 transmit neighboring wireless communication signals in two or more frequency bands, and/or in two or more channels of a given frequency band. Some embodiments of controller 206 are configured to determine location characteristics 112 based on two or more neighboring wireless communication signals transmitted from a common neighboring wireless access point, such to achieve a more accurate determination of the location characteristics.

For example, referring again to FIGS. 1 and 2, in certain embodiments, neighboring wireless access point 104 is configured to transmit neighboring wireless communication signal 116 in each of the 2.4 GHZ and 5 GHz frequency bands, and wireless access point 102 is configured to determine angular orientation $\theta_1$ by repeating the method of Example A for both frequency bands. In other words, wireless access point 102 determines a first value of $\theta_1$ using the Example A method based on neighboring wireless communication signal 116 in the 2.4 GHz frequency band, and wireless access point 102 determines a second value of $\theta_1$ using the Example A method based on neighboring wireless communication signal 116 in the 5 GHz frequency band. Controller 206 optionally determines a final value of angular orientation $\theta_1$ to be an average, or another mathematical function, of these two values determined values of $\theta_1$.

As another example, referring to FIGS. 3 and 4 again, in certain embodiments, neighboring wireless access point 104 is configured to transmit neighboring wireless communication signal 116 in each of the 2.4 GHz and 5 GHz frequency bands, and neighboring wireless access point 304 is configured to transmit neighboring wireless communication signal 316 in each of the 5 GHZ and 6 GHz frequency bands. In these embodiments, wireless access point 102 is optionally configured to determine location characteristics 112 by repeating the method of Example B for each two or more different pair of neighboring wireless communications signals. For example, controller 206 could determine (a) a first set of location characteristics 112 based on neighboring wireless communication signal 116 in the 2.4 GHz range and neighboring wireless communication signal 316 is the 5 GHZ range and (b) a second set of location characteristics 112 based on neighboring wireless communication signal 116 in the 5 GHz range and neighboring wireless communication signal 316 is the 6 GHz range. Controller 206 optionally determines a final value of location characteristics 112 to be an average, or another mathematical function, of these two values of location characteristics 112.

Figure 5:
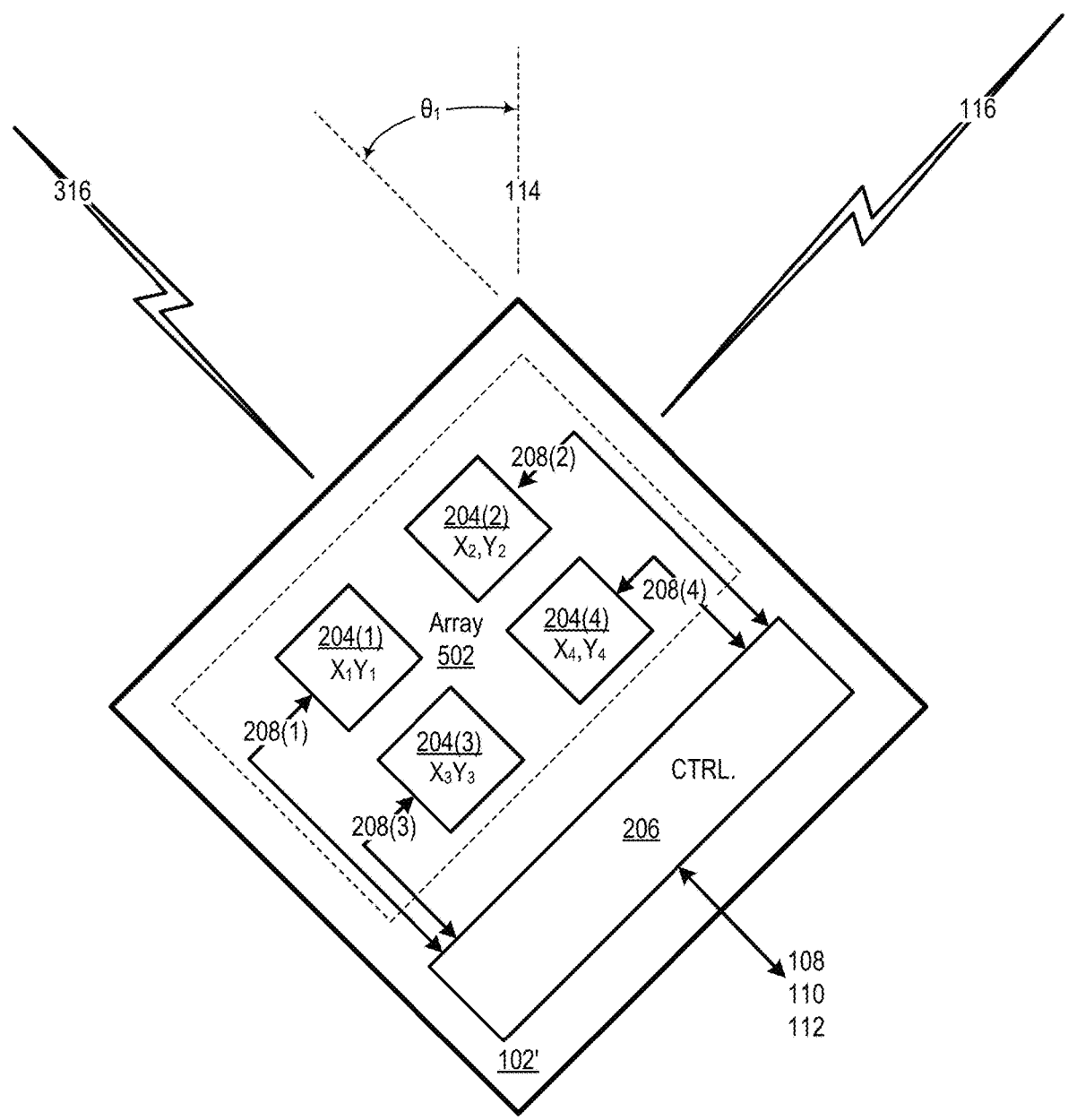
FIG. 5 is a block diagram of an alternate embodiment of the FIG. 4 wireless access point.

As discussed above, while FIGS. 2 and 4 illustrate array 202 as including three antenna elements 204, array 202 could be modified to include additional antenna elements 204. For example, FIG. 5 is a block diagram of a wireless access point 102' including an array 502 of four antenna elements 204 in place of array 202 of three antenna elements 204. Each antenna element 204 has a different respective location in array 502. Specifically, antenna elements 504(1), 504(2), 504(3), and 504(4) has respective locations $X_1, Y_1$; $X_2, Y_2$; $X_3, Y_3$; and $X_4, Y_4$. The additional antenna element 204 of wireless access point 102' may enable wireless access point 102' to generate more-accurate location characteristics 112 than wireless access point 102. Furthermore, the additional antenna element 204 of wireless access point 102' may enable wireless access point 102' to achieve higher wireless communication performance than wireless access point 102.

Figure 6:
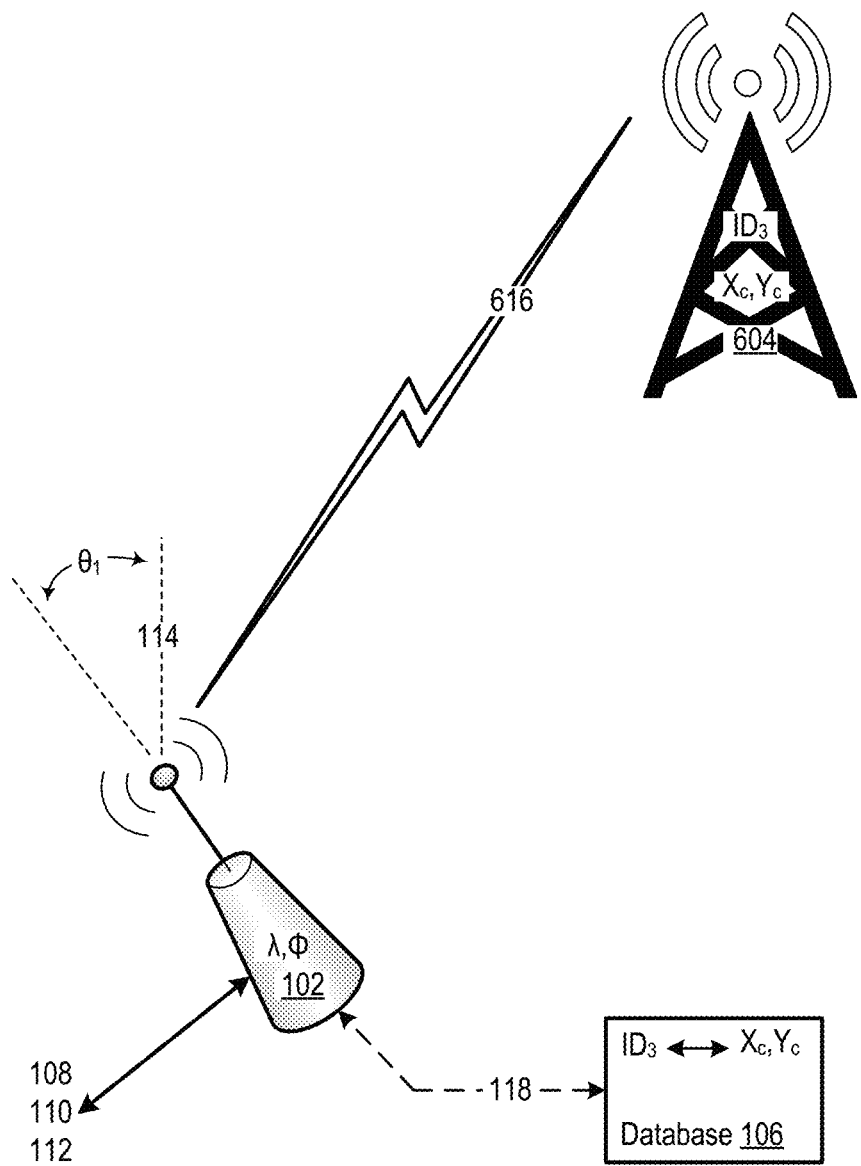
FIG. 6 is a schematic diagram of an alternate embodiment of the FIG. 1 communication network environment including a cellular neighboring wireless access point in place of a Wi-Fi neighboring wireless access point.

Some embodiments of wireless access point 102 are configured to determine location characteristics based on one or more neighboring wireless communication signal transmitted by respective neighboring wireless access points operating according to a different communication protocol than wireless access point 102. For example, FIG. 6 is a schematic diagram of a communication network environment 600 which is an alternate embodiment of communication network environment 100 where Wi-Fi neighboring wireless access point 104 is replaced with a cellular neighboring wireless access point 604. Neighboring wireless access point 604 has an identity $ID_3$ and a location $X_c$, $Y_c$, as illustrated in FIG. 6. Neighboring wireless access point 604 generates a neighboring wireless communication signal 616 complying with a cellular communication protocol, e.g., a LTE, 5G, or 6G cellular communication protocol. Although wireless access point 102 is a Wi-Fi wireless access point, the particular embodiment of wireless access point 102 illustrated in FIG. 6 is nevertheless able to receive neighboring wireless communication signal 616. For example, wireless access point 102 may be capable of receiving 2.4 GHz wireless communication signals, and neighboring wireless communication signal 616 may be in a frequency band (e.g., 2.5 GHZ) that is relatively close to 2.4 GHZ, such that wireless access point 102 is capable of receiving neighboring wireless communication signal 616, even though wireless access point 102 is not necessarily designed to receive neighboring wireless communication signal 616. Alternately, some embodiments of wireless access point 102 may be further capable of transmitting and receiving wireless communication signals complying with a cellular communication protocol, e.g., a LTE, 5G, or 6G cellular communication protocol, such that wireless access point 102 is inherently capable of receiving neighboring wireless communication signal 616.

Wireless access point 102 is configured to determine location characteristics 112, for example, by performing the method of Example A based on neighboring wireless communication signal 616. Additionally, in embodiments of communication network environment 600 including one or more additional neighboring wireless access points (not shown), wireless access point 102 is optionally configured to perform the method of Example B based on neighboring wireless communication signal 616 and one or more additional neighboring wireless communication signals. In some embodiments, location of neighboring wireless access point 604 is included in database 106 or another database (not shown) accessible to wireless access point 102.

Figure 7:
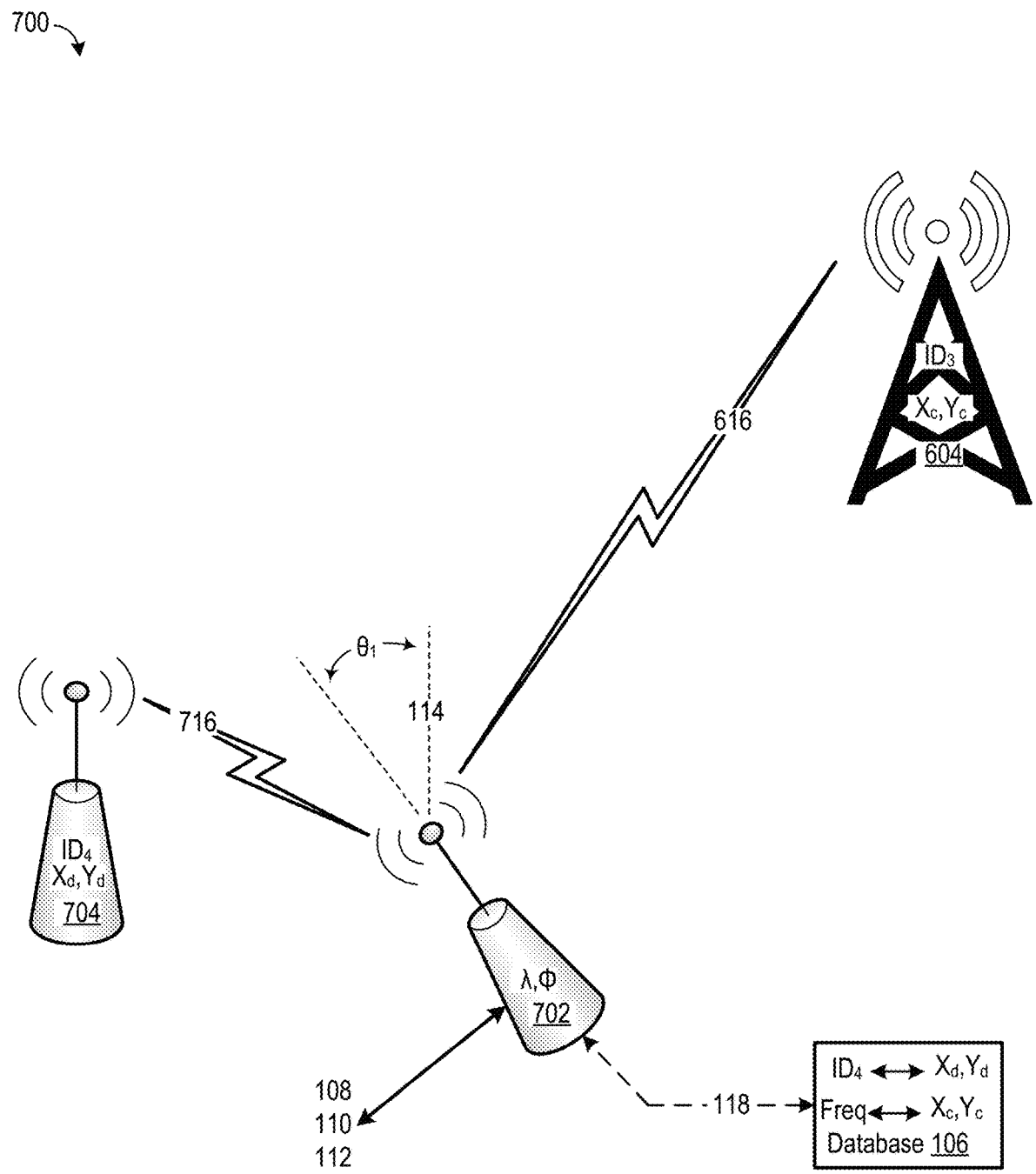
FIG. 7 is a schematic diagram of an alternate embodiment of the FIG. 6 communication network environment including an additional neighboring wireless access point.

Additionally, some embodiments of wireless access point 102 that are not capable of decoding neighboring wireless communication signal 616 may nevertheless be capable of identifying the wireless access point transmitting neighboring wireless communication signal 616 based on frequency characteristics of neighboring wireless communication signal 616 and location of another neighboring wireless access point. For example, FIG. 7 is a schematic diagram of a communication network environment 700 which is an alternate embodiment of communication network environment 600 including an additional neighboring wireless access point 704 which transmits a neighboring wireless communication signal 716 complying with a Wi-Fi communication protocol. Additionally, wireless access point 102 is implemented by a wireless access point 702 in environment 700. Wireless access point 702 is an embodiment of wireless access point 102 that operates according to a Wi-Fi communication protocol and is not capable of decoding neighboring wireless communication signal 616.

Wireless access point 702 is configured to decode neighboring wireless communication signal 716 to determine an identity $ID_4$ of neighboring wireless access point 704. Additionally, wireless access point 702 is configured to determine a location $X_d$, $Y_d$ of neighboring wireless access point 704 from location $ID_4$, such as by querying database 106. Although wireless access point 702 is not capable of decoding neighboring wireless communication signal 616, wireless access point 702 is nevertheless capable of determining a frequency (Freq) of neighboring wireless communication signal 616. Wireless access point 702 is advantageously configured to determine location $X_c$, $Y_c$ of neighboring wireless access point 604 from location $X_d$, $Y_{ad}$ of neighboring wireless access point 704 and frequency of neighboring wireless communication signal 616. In particular, location $X_d$, $Y_d$ of neighboring wireless access point 704 is necessarily close to location $X_c$, $Y_c$ of neighboring wireless access point 604 because the two neighboring wireless access points have overlapping coverage areas. Consequently, neighboring wireless access point 604 is likely to be included in a database, e.g., database 106, of cellular wireless access points in the vicinity of location $X_d$, $Y_d$. Wireless access point 702 can therefore query the database to determine an identity and location of a cellular wireless access point corresponding to the frequency of neighboring wireless communication signal 616.

Figure 8:
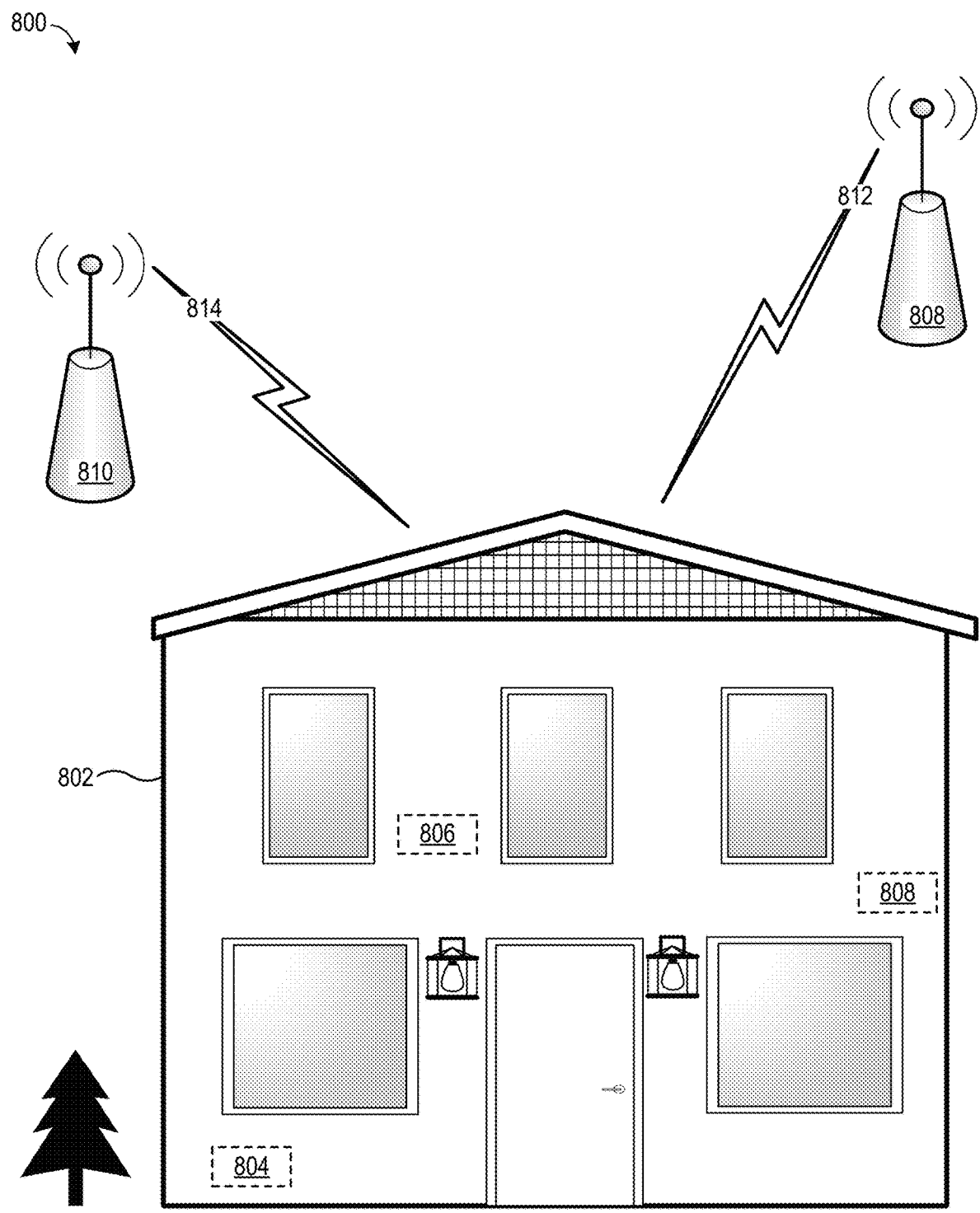
FIG. 8 is a schematic diagram of a communication network environment including a building with a plurality of wireless access points configured to automatically determine respective location characteristics, according to an embodiment.

One possible application of the new systems and methods for automatically determining a location characteristic of a wireless access point is to determine respective locations and/or angular orientations of wireless access points in a building. For example, FIG. 8 is a schematic diagram of a communication network environment 800 including a building 802 with three wireless access point 804, 806, and 808 at different respective locations therein. Wireless access points 804, 806, and 808 are symbolically shown in dashed lines, and each wireless access point 804, 806, and 808 is an embodiment of wireless access point 102 or wireless access point 102'. Wireless access points 804, 806, and 808 are within range of neighboring wireless access points 808 and 810, and each wireless access point 804, 806, and 808 is therefore capable of receiving neighboring wireless communication signals 812 and 814 transmitted by neighboring wireless access points 808 and 810, respectively. Each wireless access point 804, 806, 808 is capable of automatically determining respective location characteristics based on neighboring wireless communication signals 812 and 814, such as using a method similar to that of Example B above. Therefore, a party operating, maintaining, and/or troubleshooting wireless access points 804, 806, 808 may advantageously be able to remotely determine location characteristics of the wireless access points.

Figure 9:
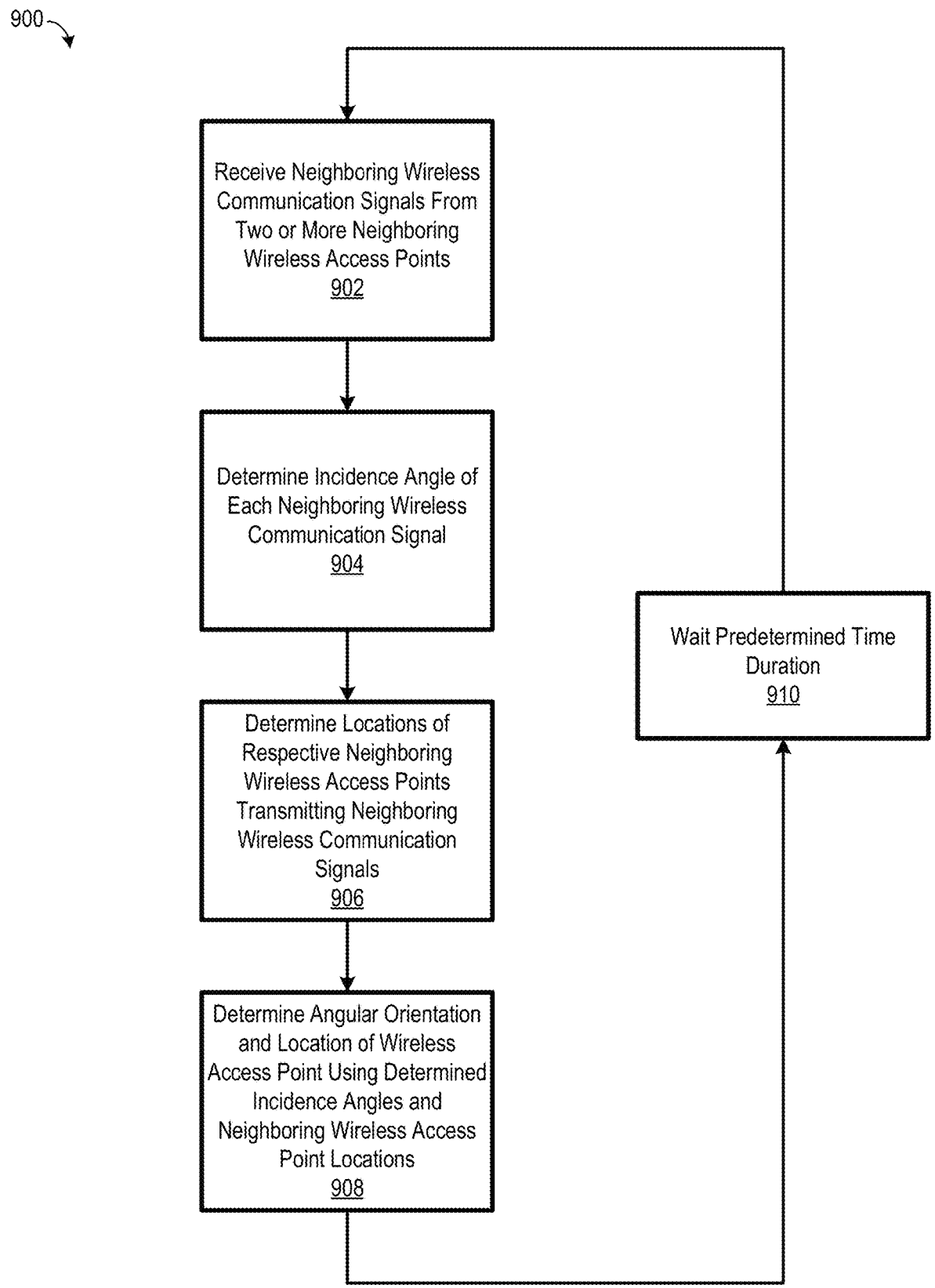
FIG. 9 is a flow chart of a method for automatically determining a location characteristic of a wireless access point, according to an embodiment.

FIG. 9 is a flow chart of a method 900 for automatically determining a location characteristic of a wireless access point. While method 900 is discussed below with respect to wireless access point 102 in the FIG. 3 communication network environment, method 900 could performed in other communication network environments, as well by other wireless access points. For example, method 900 could be applied to communication network environments including additional neighboring wireless access points.

In a block 902 of method 900, wireless access point 102 receives neighboring wireless communication signals from two or more neighboring wireless access points. In one example of block 902, wireless access point 102 receives neighboring wireless communication signals 116 and 316 from neighboring wireless access points 104 and 304, respectively. In a block 904 of method 900, wireless access point 102 determines a respective angle of incidence for each neighboring wireless communication signal received in block 902. In one example of block 904, wireless access point 102 determines respective angles of incidence $\theta_{n1}$ and $\theta_{n2}$ of neighboring wireless communication signals 116 and 316. It should be noted that angles of incidence $\theta_{n1}$ and $\theta_{n2}$ are different from angular orientation $\theta_1$. In particular, angles of incidence $\theta_{n1}$ and $\theta_{n2}$ represent respective angles that neighboring wireless communication signals 116 and 316 impinge on wireless access point 102, such as relative to a particular feature (e.g., side) of wireless access point 102. Angular orientation $\theta_1$, in contrast, represents angular orientation of wireless access point 102 relative to a reference direction.

In a block 906 of method 900, wireless access point 102 determines respective locations of each neighboring wireless access point transmitting neighboring wireless communication signals. In one example of block 906, wireless access point 102 queries database 106 to determine respective locations $X_a$, $Y_a$ and $X_b$, $Y_b$ of neighboring wireless access points 104 and 304. In a block 908 of method 900, wireless access point 102 determines its angular orientation and location using the incidence angles determined in block 904 and the locations determined in block 906. In one example of block 908, wireless access point 102 determines its angular orientation $\theta_1$ and its location $\lambda$ and $\Phi$ using angles of incidence $\theta_{n1}$ and $\theta_{n2}$ and locations $X_a$, $Y_a$ and $X_b$, $Y_b$ using a conventional angle of orientation and location calculation method known in the art. Method 900 proceeds from block 908 to a block 910 where method 900 waits for a predetermined time duration, such as a time duration that is sufficiently small so that it is unlikely for wireless access point 102 to be moved or rotated while method 900 waits in block 910. Method 900 subsequently returns to block 902 from block 910.

Figure 10:
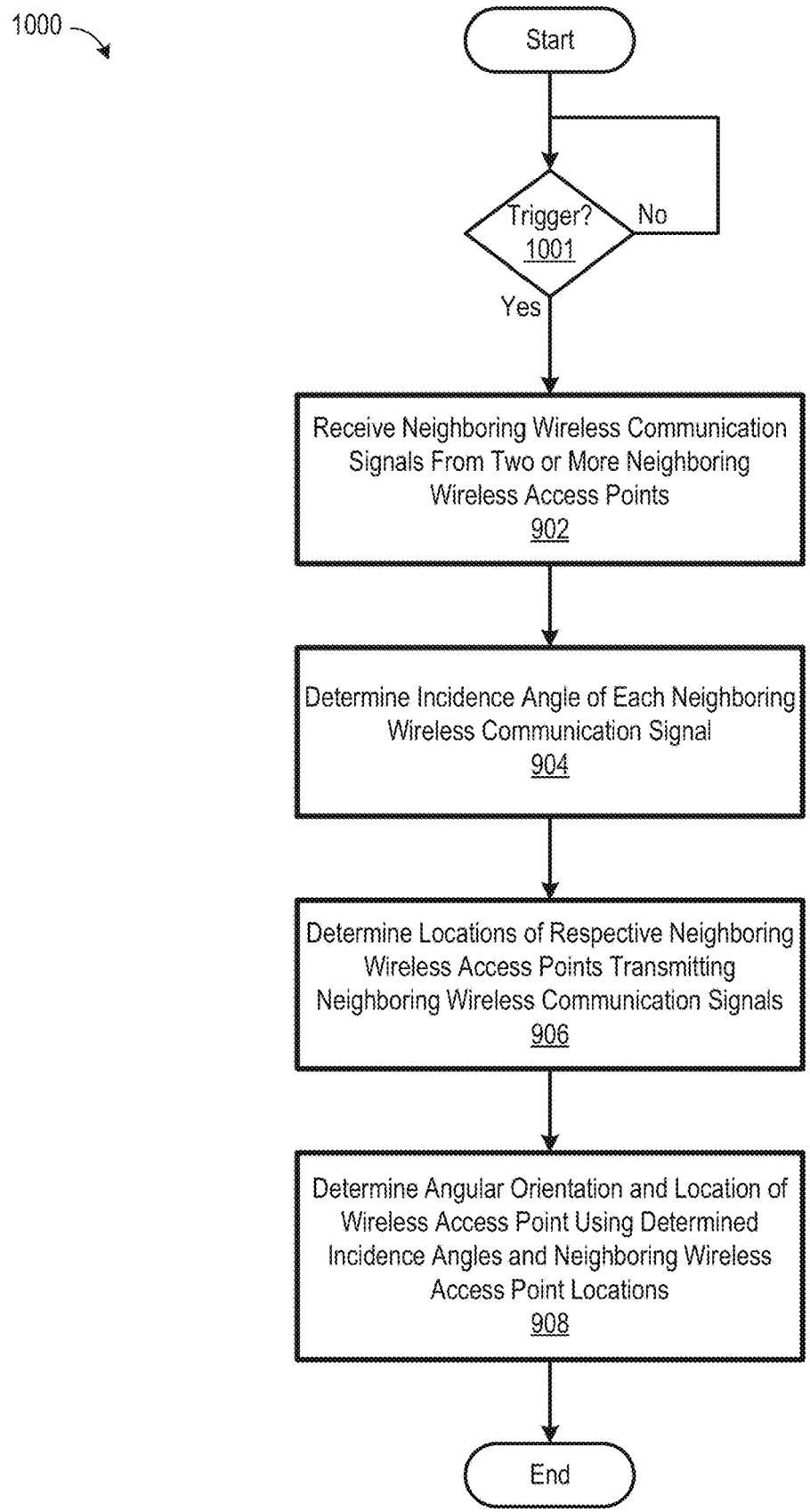
FIG. 10 is a flow chart of an alternate embodiment of the FIG. 9 method for automatically determining a location characteristic of a wireless access point.

FIG. 10 is a flow chart of a method 1000 for automatically determining a location characteristic of a wireless access point. Method 1000 is an alternate embodiment of method 900 that does not operate in a loop. Instead, method 1000 includes a decision block 1001 where wireless access point 102 determines whether a trigger condition has occurred. If the result of decision block 1001 is no, method 1000 returns to decision block 1001. If the result of decision block 1001 is yes, method 1000 executes blocks 902, 904, 906, and 908 as discussed above with respect to FIG. 9. However, method 1000 ends after executing block 908 instead of looping back to block 902. Examples of possible trigger conditions include, but are not limited to, detection of a performance issue associated with wireless access point 102 and/or detection of movement of wireless access point 102.

Combinations of Features

Features described above may be combined in various ways without departing from the scope hereof. The following examples illustrate some possible combinations.

(A1) A method for automatically determining a location characteristic of a wireless access point includes (1) receiving, via an array of at least three antenna elements of the wireless access point, a first neighboring wireless communication signal from a first neighboring wireless access point, (2) determining a location of the first neighboring wireless access point, and (3) determining the location characteristic of the wireless access point at least partially based on (a) the location of the first neighboring wireless access point and (b) difference in phase of the first neighboring wireless communication signal between the least three antenna elements of the wireless access point.

(A2) In the method denoted as (A1), determining the location of the first neighboring wireless access point may include (1) determining an identity of the first neighboring wireless access point and (2) determining the location of the first neighboring wireless access point at least partially based on the identity of the first neighboring wireless access point.

(A3) In the method denoted as (A2), determining the identity of the first neighboring wireless access point may include determining a basic service set identifier (BSSID) of the first neighboring wireless access point.

(A4) In any one of the methods denoted as (A2) and (A3), determining the location of the first neighboring wireless access point at least partially based on the identity of the first neighboring wireless access point may include querying a database associating the identity of the first neighboring wireless access point with the location of the first neighboring wireless access point.

(A5) In any one of the methods denoted as (A1) through (A4), the location characteristic of the wireless access point may include an angular orientation of the wireless access point.

(A6) Any one of the methods denoted as (A1) through (A5) may further include (1) receiving, via the array of at least three antenna elements of the wireless access point, a second neighboring wireless communication signal from a second neighboring wireless access point, (2) determining a location of the second neighboring wireless access point, and (3) determining the location characteristic of the wireless access point at least partially based on difference in phase of the second neighboring wireless communication signal between the at least three antenna elements of the wireless access point.

(A7) In the method denoted as (A6), the location characteristic of the wireless access point may include a two-dimensional location of the wireless access point.

(A8) In the method denoted as (A7), the two-dimensional location of the wireless access point may include a latitude and longitude of the wireless access point.

(A9) In any one of the methods denoted as (A1) through (A8), each of the wireless access point and the first neighboring wireless access point may operate according to a common communication protocol.

(A10) In any one of the methods denoted as (A1) through (A9) each of the wireless access point and the first neighboring wireless access point may be a Wi-Fi wireless access point.

(A11) In any one of the methods denoted as (A1) through (A8), the wireless access point and the first neighboring wireless access point may operate according to different respective communication protocols.

(A12) In the method denoted as (A11), the wireless access point may operate according to a Wi-Fi communication protocol, and the first neighboring wireless access point may operate according to a cellular communication protocol.

(A13) In the method denoted as (A12), the Wi-Fi communication protocol may be a 2.4 gigahertz (GHz) Wi-Fi communication protocol, and the cellular communication protocol may be a 2.5 GHz cellular communication protocol.

(A14) Any one of the methods denoted as (A1) through (A13) may further include (1) receiving, via the array of at least three antenna elements of the wireless access point, a second neighboring wireless communication signal from the first neighboring wireless access point, and (2) determining the location characteristic of the wireless access point at least partially based on difference in phase of the second neighboring wireless communication signal between the least three antenna elements of the wireless access point.

(A15) In the method denoted as (A14), the first and second neighboring wireless communication signals may be in different respective frequency bands.

(A16) In the method denoted as (A15), the first neighboring wireless communication signal may be within a 2.4 gigahertz (GHz) frequency band, and the second neighboring wireless communication signal may be within a 5 GHz frequency band.

(A17) Any one of the methods denoted as (A1) through (A16) may further include determining the location characteristic of the wireless access point at least partially based on respective positions of the at least three antenna elements of the wireless access point.

(B1) A method for automatically determining a location characteristic of a wireless access point includes (1) determining a difference in phase of a first neighboring wireless communication signal at three or more different points on the wireless access point, (2) determining a location of a first neighboring wireless access point transmitting the first neighboring wireless communication signal, and (3) determining the location characteristic of the wireless access point at least partially based on (a) the difference in phase of first neighboring wireless communication signal at the three or more different points on the wireless access point and (b) the location of the first neighboring wireless access point.

(B2) In the method denoted as (B1), determining the location characteristic of the first neighboring wireless access point may include (1) determining an identity of the first neighboring wireless access point and (2) determining the location of the first neighboring wireless access point at least partially based on the identity of the first neighboring wireless access point.

(B3) In any one of the methods denoted as (B1) and (B2), the location characteristic of the wireless access point may include one or more of an angular orientation of the wireless access point and a two-dimensional location of the wireless access point.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for automatically determining a location characteristic of a wireless access point, the method comprising:
    receiving, via an array of at least three antenna elements of the wireless access point, a first neighboring wireless communication signal from a first neighboring wireless access point;
    determining an identity of the first neighboring wireless access point;
    determining a location of the first neighboring wireless access point at least partially based on the identity of the first neighboring wireless access point at least partially by querying a database associating the identity of the first neighboring wireless access point with the location of the first neighboring wireless access point; and
    determining the location characteristic of the wireless access point at least partially based on (a) the location of the first neighboring wireless access point and (b) difference in phase of the first neighboring wireless communication signal between the at least three antenna elements of the wireless access point.

2. The method of claim 1, wherein the location characteristic of the wireless access point comprises an angular orientation of the wireless access point.

3. The method of claim 1, further comprising:
    receiving, via the array of at least three antenna elements of the wireless access point, a second neighboring wireless communication signal from a second neighboring wireless access point;
    determining a location of the second neighboring wireless access point; and
    determining the location characteristic of the wireless access point at least partially based on difference in phase of the second neighboring wireless communication signal between the at least three antenna elements of the wireless access point.

4. The method of claim 3, wherein the location characteristic of the wireless access point comprises a two-dimensional location of the wireless access point.

5. The method of claim 4, wherein the two-dimensional location of the wireless access point comprises a latitude and longitude of the wireless access point.

6. The method of claim 1, wherein each of the wireless access point and the first neighboring wireless access point operates according to a common communication protocol.

7. The method of claim 1, wherein each of the wireless access point and the first neighboring wireless access point is a Wi-Fi wireless access point.

8. The method of claim 1, wherein the wireless access point and the first neighboring wireless access point operate according to different respective communication protocols.

9. The method of claim 1, further comprising:
    receiving, via the array of at least three antenna elements of the wireless access point, a second neighboring wireless communication signal from the first neighboring wireless access point; and
    determining the location characteristic of the wireless access point at least partially based on difference in phase of the second neighboring wireless communication signal between the at least three antenna elements of the wireless access point.

10. The method of claim 9, wherein the first and second neighboring wireless communication signals are in different respective frequency bands.

11. The method of claim 1, further comprising determining the location characteristic of the wireless access point at least partially based on respective positions of the at least three antenna elements of the wireless access point.

12. A method for automatically determining a location characteristic of a wireless access point, the method comprising:
    receiving, via an array of at least three antenna elements of the wireless access point, a first neighboring wireless communication signal from a first neighboring wireless access point;
    determining an identity of the first neighboring wireless access point at least partially by determining a basic service set identifier (BSSID) of the first neighboring wireless access point;

determining a location of the first neighboring wireless access point at least partially based on the identity of the first neighboring wireless access point; and determining the location characteristic of the wireless access point at least partially based on (a) the location of the first neighboring wireless access point and (b) difference in phase of the first neighboring wireless communication signal between the at least three antenna elements of the wireless access point.

13. A method for automatically determining a location characteristic of a wireless access point, the method comprising:

receiving, via an array of at least three antenna elements of the wireless access point, a first neighboring wireless communication signal from a first neighboring wireless access point;

determining a location of the first neighboring wireless access point; and determining the location characteristic of the wireless access point at least partially based on (a) the location of the first neighboring wireless access point and (b) difference in phase of the first neighboring wireless communication signal between the at least three antenna elements of the wireless access point;

wherein:
the wireless access point operates according to a Wi-Fi communication protocol, and
the first neighboring wireless access point operates according to a cellular communication protocol.

14. The method of claim 13, wherein:
the Wi-Fi communication protocol is a 2.4 gigahertz (GHz) Wi-Fi communication protocol; and
the cellular communication protocol is a 2.5 GHz cellular communication protocol.

15. A method for automatically determining a location characteristic of a wireless access point, the method comprising:

receiving, via an array of at least three antenna elements of the wireless access point, a first neighboring wireless communication signal from a first neighboring wireless access point;

receiving, via the array of at least three antenna elements of the wireless access point, a second neighboring wireless communication signal from the first neighboring wireless access point;

determining a location of the first neighboring wireless access point; and determining the location characteristic of the wireless access point at least partially based on (a) the location of the first neighboring wireless access point, (b) difference in phase of the first neighboring wireless communication signal between the at least three antenna elements of the wireless access point, and (c) difference in phase of the second neighboring wireless communication signal between the at least three antenna elements of the wireless access point;

wherein:
the first and second neighboring wireless communication signals are in different respective frequency bands,
the first neighboring wireless communication signal is within a 2.4 gigahertz (GHz) frequency band, and
the second neighboring wireless communication signal is within a 5 GHz frequency band.

16. A method for automatically determining a location characteristic of a wireless access point, the method comprising:

determining a difference in phase of a first neighboring wireless communication signal at three or more different points on the wireless access point;

determining an identity of a first neighboring wireless access point that is transmitting the first neighboring wireless communication signal;

determining a location of the first neighboring wireless access point at least partially based on the identity of the first neighboring wireless access point; and determining the location characteristic of the wireless access point at least partially based on (a) the difference in phase of first neighboring wireless communication signal at the three or more different points on the wireless access point and (b) the location of the first neighboring wireless access point;

wherein the location characteristic of the wireless access point includes one or more of an angular orientation of the wireless access point and a two-dimensional location of the wireless access point.

* * * * *